United States Patent [19]

Trnka

[11] Patent Number: 4,990,201

[45] Date of Patent: Feb. 5, 1991

[54] METHOD FOR RETICULATING PERFORATED SHEETS

[75] Inventor: Thomas E. Trnka, Kent, Wash.

[73] Assignee: The Boeing Company, Seattle, Wash.

[21] Appl. No.: 338,924

[22] Filed: Apr. 14, 1989

[51] Int. Cl.$^5$ .......................... B32B 31/12; B32B 31/26
[52] U.S. Cl. ...................................... 156/85; 156/252;
156/253; 156/285; 156/309.6; 156/330;
156/356; 156/497; 264/504
[58] Field of Search ............... 156/350, 356, 357, 252,
156/513, 497, 82, 253, 85, 285, 309.6, 330;
118/63, 669; 264/504

[56] References Cited

U.S. PATENT DOCUMENTS

| | | |
|---|---|---|
| 3,445,270 | 5/1969 | Lorck . |
| 3,656,992 | 4/1972 | Lynam et al. . |
| 3,695,219 | 10/1972 | Arian et al. ............................ 118/50 |
| 3,948,212 | 4/1976 | Mayer .................................... 118/50 |
| 4,155,800 | 5/1979 | Wilson .................................. 156/497 |
| 4,249,974 | 2/1981 | Wilson .................................... 156/85 |
| 4,284,457 | 8/1981 | Stonier et al. ....................... 156/237 |
| 4,644,897 | 2/1987 | Fender ................................. 118/326 |
| 4,753,824 | 6/1988 | Toda et al. .......................... 427/286 |
| 4,857,367 | 8/1989 | Thorn ................................... 118/63 |

Primary Examiner—Michael Wityshyn
Attorney, Agent, or Firm—E. F. Harasek; B. A. Donahue; D. T. Anderson

[57] ABSTRACT

A novel method is provided for reticulating adhesive-backed, perforated substrates. The method entails tacking a continuous sheet of viscous reticulating adhesive to one side of the substrate and then contacting the other side with heated air. The temperature of the air is regulated such that the adhesive softens and bubbles over the perforations but final cure is not initiated. The air is directed at a velocity such that the bubbles burst and the adhesive is redeposited onto the adhesive-side of the substrate.

6 Claims, No Drawings

METHOD FOR RETICULATING PERFORATED SHEETS

This invention relates to a controlled method of applying a curable adhesive layer to a perforated sheet and then cleaning the adhesive from the perforations. More particularly, the invention relates to a method of applying a viscous adhesive sheet to the back of a perforate substrate and automatically clearing the perforations of the adhesive and dispersing it substantially evenly adjacent the perforations by the controlled application of heat and high velocity air.

BACKGROUND

One method of suppressing noise in jet engines is to baffle the intake with an acoustical panel. In the Boeing 737-300 series aircraft, such panels comprise a trilaminate of a perforated aluminum alloy sheet, a honeycomb aluminum alloy core and a solid aluminum alloy backing sheet. This laminate is located in the engine cowl such that a portion of the intake air flows through the holes in the perforate sheet and reverberates in the honeycombs, thereby damping undesired frequencies and harmonics. The three layers of the laminate are held together by a cured epoxy adhesive. However, if epoxy adhesive blocks the holes in the perforate top sheet, noise suppression characteristics may be inhibited. It is also desirable to form a uniform adhesive bond between layers to optimize noise reduction performance.

In a past laminate fabrication method, a sheet of tacky epoxy resin was applied to one side of the aluminum honeycomb core. To prevent the epoxy from blocking air flow, the resin was heated with a quartz lamp and the honeycomb core was manually passed over an air knife, clearing epoxy away from the cell openings. As the epoxy cleared from the honeycomb openings, it collected on the cell edges and walls. The adhesive coated honeycomb was later mated to a clean perforated aluminum sheet by heating in an autoclave.

This method is described in U.S. Pat. No. 4,249,974 assigned to the assignee hereof and incorporated herein by reference. Related U.S. Pat. No. 4,155,800 claims reticulated honeycomb product made by the method of the '974 patent.

This process was difficult to control in both the heating and honeycomb-clearing stages. If too much heat was applied the epoxy would cure prematurely and if too little was applied the epoxy was prone to blow off the core altogether. Similarly, if the air knife was brought too close, it could blow the adhesive off completely or if it was held too far away, the honeycombs would not clear. Accordingly, it was often necessary to patch an adhesive coated honeycomb by hand before making a lamination. Moreover, considerable epoxy splitter was generated.

According, I have developed a novel method and an apparatus for clearing adhesive from the holes of a perforated substrate and creating a uniform layer of curable adhesive thereon. This process may be referred to herein as reticulation or reticulating.

BRIEF SUMMARY

In accordance with a preferred embodiment of the invention, a substrate such as a sheet of a aluminum metal, having a plurality of small holes or perforations is provided. A thin layer of tacky, sheet epoxy or other suitable adhesive is applied to the back or bonding side of the substrate. This may be done, for example, by manually directing a hot air gun or other heating device over a sheet of adhesive draped over a perforated substrate until the resin softens and conforms to the contour of the substrate or by using a flexible roller to squeeze the adhesive onto the substrate. This creates a curable adhesive-substrate laminate wherein the holes in the substrate are substantially covered and blocked by the adhesive.

The adhesive backed substrate is then positioned in a fixture which provides the application of high velocity hot air with an automatically controlled nozzle. The adhesive-free side of the laminate faces the hot air source. Most preferably the hot air source is positioned art the end of a programmable robot arm with multiaxial movement capabilities. The robot moves the nozzle past the substrate in a predetermined pattern so the hot, high velocity air impinges on the substrate at a uniform rate. Variables such as nozzle speed with respect to the substrate, air velocity, air temperature and the air spray pattern are controlled to cause the adhesive to heat up and bubble over the perforations. The bubbles burst with the assistance of the pressurized air. The adhesive from the burst bubbles is thereby uniformly distributed over the continuous portion of the perforated substrate and all the perforations are cleared. This operation is performed at a rapid rate so that the adhesive softens but does not cure. The adhesive coated perforated substrate is permanently bonded to another substrate by locating them adjacent one another with the adhesive layer therebetween and heating for a suitable time at a suitable temperature to finally cure the adhesive.

DETAILED DESCRIPTION

My invention will be better understood in terms of the following detailed description and example.

EXAMPLE

A sheet of 0.025-0.032 in. thick aluminum alloy was punched with uniformly spaced round holes 0.035 to 0.045 in. diameter about 0.05 to 0.08 in. apart from each other at their closest. The perforated aluminum sheet was blanked to size and formed to the concave contour of the inside of the engine cowling. The sheet was about 49.6 in. long, 43 in. wide and curved on a radius of 24.8 in.

A sheet of very viscous, rubber-filled reticulating epoxy about 0.004 to 0.012 in., and preferably 0.004-0.007 in. thick, was unrolled and draped over the perforated sheet and the protective backing sheet for the epoxy was removed. One such reticulating epoxy is BMS5104 which is sold by 3M Corporation. The epoxy is tacked to the convex side of the sheet using a hand held heat gun. The epoxy is heated only enough to soften it and make sure it uniformly contacts the aluminum sheet and does not move when the sheet is in a vertical position.

The aluminum-epoxy laminate is then mounted vertically on a fixture for reticulation. The fixture rotates the laminate into position in front of a nozzle about 11.5 in. long and 0.25 in. wide at its outlet. Heated air exits the nozzle at a suitable velocity. In my apparatus, the nozzle was mounted at the end of the arm of a Cincinnati Milacron T3 776 Electric Robot and Controller. The nozzle was equipped with a 15 kW resistance heater and a blower. The robot was programmed to sweep the nozzle past the sheet at a uniform rate at a distance of about 1 inch. A left-to-right, increment down, right-to-left repetitive spray pattern was followed. The angle between the air flow and the plane of the sheet was about 15°. The sheet's exposure to the hot air did not exceed 12 second at any location.

Treating the sheet with air exiting the nozzle at 395°–410° F. at a velocity of 9000 ft/min resulted in 100% clearing of the perforations and the creation of a uniform, curable epoxy coating on the back of the sheet. Using these operating parameters, the epoxy reached a maximum temperature of about 270° F. This allowed it to bubble up over the holes without initiating final cure. Furthermore, the epoxy from the burst bubbles redistributed evenly over the back of the sheet and the process was virtually splatter-free.

While my invention has been described specifically in terms of clearing a uniform epoxy coating from a perforated aluminum sheet, it is clearly adaptable by one skilled in the art to reticulate other perforate substrates, for example, sheets of other metals or alloys, polymeric materials, particularly high melting thermoset materials, or ceramics could be readily reticulated by my method. The term perforate substrate as used herein would include not only punched sheets but also any sheet-like structure with holes therethrough. This could include, for example, honeycomb cores, corrugated cores, metal matrixes, wire meshes, etc.

Similarly ereticulating adhesives other then epoxies such as aldehydes, acrylates, polyesters, acetates, nitrates, urethanes and other suitable condensation polymerization products, could be used so long as they can be reticulated without curing completely.

Clearly, process parameters such as the temperature of the air or other gas, the rate of flow of the gas from the nozzle; the size and shape of the nozzle opening; the angle between the workpiece and the gas from the nozzle; the dwell time of the heat and air; etc. could be readily adapted to desired reticulation substrate-adhesive combinations.

Accordingly, my invention is to be limited only in accordance with the following claims:

I claim:

1. A method of reticulating a perforated substrate comprising the steps of tacking a sheet of viscous reticulating adhesive onto one side of the perforated substrate; positioning said perforated substrate in a stationary fixture adjacent a nozzle for heated air; positioning said nozzle on a robot arm and controlling the motion of said nozzle with respect to said substrate such that the nozzle sweeps the entire adhesive-free surface of the perforated substrate in a controlled manner at a substantially constant rate and at a substantially constant distance; controlling the temperature and rate of flow of the air through said nozzle as it is manipulated by the robot arm such that the adhesive softens and bubbles over the perforations in the perforated substrate but such that the temperature of the adhesive remains below the temperature at which final cure is initiated; and controlling the flow rate of air from the nozzle such that said bubbles burst and the adhesive is substantially redeposited onto the adhesive side of the substrate.

2. The method of claim 1 where the perforated substrate is a panel for use on an aircraft.

3. The method of claim 1 where the adhesive is a rubber-filled epoxy.

4. The method of claim 1 where the nozzle is attached to a robot arm capable of programmable multiaxial motion.

5. The method of claim 1 wherein the perforated substrate is aluminum, the adhesive is a rubber-filled epoxy, and the total dwell time of hot air from the nozzle at any location on the adhesive free side of the perforated substrate exceed about 12 seconds and the temperature reached by the adhesive does not exceeds about 270° F.

6. The method of claim 1 where the perforated substrate is taken from the group consisting of metal sheets, ceramic sheets and polymeric sheets.

* * * * *

UNITED STATES PATENT AND TRADEMARK OFFICE
CERTIFICATE OF CORRECTION

PATENT NO. : 4,990,201

DATED : 02/05/91

INVENTOR(S) : Thomas E. Trnka

It is certified that error appears in the above-identified patent and that said Letters Patent is hereby corrected as shown below:

```
Column 1, Line 56; correct "splitter" to --splatter--.
Column 1, Line 57; correct "According" to --Accordingly--.
Column 2, Line 15; correct "art" to --at--.
Column 3, Line 4; correct "second" to --seconds--.
Column 3, Line 28; correct "ereticulating" to --reticulating--.
C
Column 4, Line 35; correct "exceeds" to --exceed--.
```

Signed and Sealed this

Twenty-sixth Day of January, 1993

Attest:

STEPHEN G. KUNIN

Attesting Officer

Acting Commissioner of Patents and Trademarks